(12) United States Patent
Adogla

(10) Patent No.: US 9,942,083 B1
(45) Date of Patent: Apr. 10, 2018

(54) CAPACITY POOL MANAGEMENT

(75) Inventor: Eden G. Adogla, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 397 days.

(21) Appl. No.: 13/609,105

(22) Filed: Sep. 10, 2012

(51) Int. Cl.
*H04L 29/06* (2006.01)

(52) U.S. Cl.
CPC .................. *H04L 29/06* (2013.01)

(58) Field of Classification Search
CPC ........ G06F 9/455; G06F 9/5077; G06F 3/067; H04L 67/32
See application file for complete search history.

(56) References Cited

U.S. PATENT DOCUMENTS

| | | | | |
|---|---|---|---|---|
| 7,818,515 B1* | 10/2010 | Umbehocker | ........ | G06F 3/0605 711/114 |
| 8,141,090 B1* | 3/2012 | Graupner | ............ | G06F 9/45558 709/225 |
| 8,583,769 B1* | 11/2013 | Peters | ..................... | G06F 9/541 709/221 |
| 8,676,981 B2* | 3/2014 | Hackett | .................. | G06Q 10/06 708/100 |
| 8,935,397 B2* | 1/2015 | Seago | .................. | G06F 9/5072 709/203 |
| 9,584,389 B2* | 2/2017 | Gupta | ................. | H04L 67/1002 |
| 9,780,992 B2* | 10/2017 | Dufrene | .............. | G06F 9/45533 |
| 2008/0208365 A1* | 8/2008 | Grgic | .................... | G05B 19/042 700/2 |
| 2010/0199267 A1* | 8/2010 | Rolia | ..................... | G06Q 10/04 717/135 |
| 2012/0017210 A1* | 1/2012 | Huggins | ............... | G06F 9/5055 718/1 |
| 2012/0101968 A1* | 4/2012 | Banerjee | ............ | H04L 41/0823 706/21 |
| 2015/0006433 A1* | 1/2015 | Phillips | .................. | G06Q 40/06 705/36 R |

* cited by examiner

*Primary Examiner* — Kevin Bates
*Assistant Examiner* — Ranjan Pant
(74) *Attorney, Agent, or Firm* — Baker & Hostetler LLP

(57) ABSTRACT

Systems and methods are described for providing a computing capacity pool management service. In one embodiment, pools of computer resources having common computing configurations capable of supporting one or more virtual instance types are maintained. A request from a computing device is received to determine which of the pools the computing device can be associated with. In response to the request, a determination is made as to which of the pools the computing device can be associated with based on the common computing configurations. An indication is sent to the computing device as to which of the pools the computing device can be associated with.

18 Claims, 7 Drawing Sheets

CAPACITY POOL MANAGEMENT

BACKGROUND

A data center is a facility that houses computer systems and various networking, storage, and other related components. Many organizations and businesses operate and maintain data centers to provide computing and information services to support their day-to-day operations. Data centers may also provide computing services on a permanent or an as-needed basis to businesses and individuals as a remote computing service or to provide "software as a service" (e.g., cloud computing). The computing resources provided by a data center may include various types of resources, such as data processing resources, data storage resources, data communication resources, and the like.

To facilitate increased utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner When a customer of a data center requests a new virtual machine instance, the data center may provide a virtual machine management service that identifies a "slot" for executing the new instance. The selection of a slot for executing the new instance may include identifying an appropriate server computer on which the new instance may be executed.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
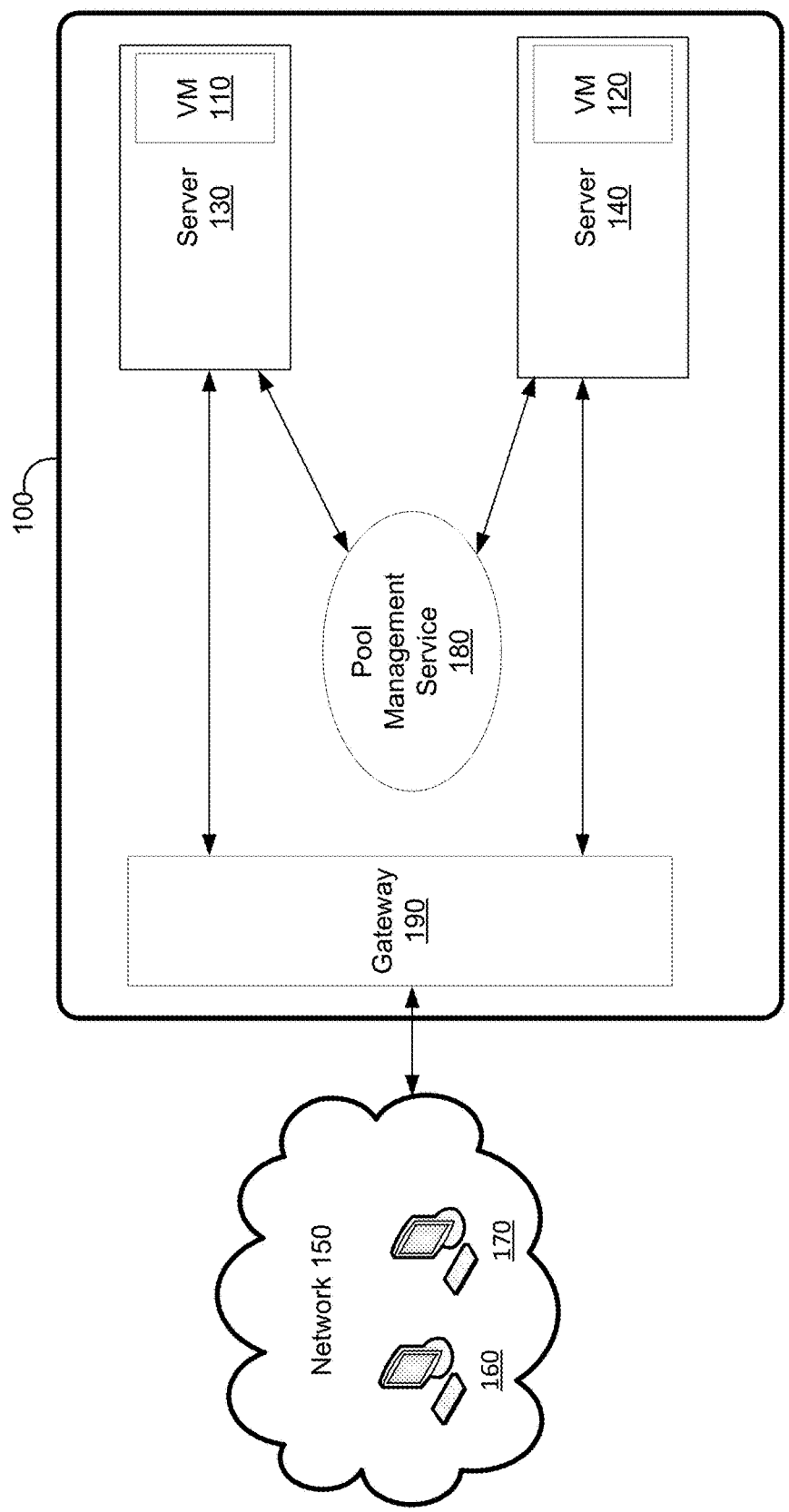
FIG. 1 is a diagram illustrating a mechanism for providing a computing capacity pool management service in accordance with the present disclosure.

The following detailed description is directed to technologies for managing computing resources such as virtual machine instances executing on one or more host server computers. Specifically, embodiments of systems and methods are described for providing a computing capacity pool management service. FIG. 1 is a diagram illustrating a system 100 including a mechanism for providing a computing capacity pool management service in accordance with the present disclosure. In FIG. 1, system 100 may include virtual machine instances 110 and 120 that may execute, for example, on one or more server computers 130 and 140. It will be appreciated that some embodiments may involve additional virtual machine instances that may be instantiated on additional server computers.

FIG. 1 also illustrates public network 150 that may include one or more computers such as computers 160 and 170. According to one embodiment, virtual machine instance 110 may be configured to provide computing services to a computer user (not shown) of public network 150 via gateway 190 and computers 160 and 170. For example, virtual machine instance 110 may provide a set of remote access enterprise applications to a group of users who may, for example, be employees of an enterprise customer.

Server 130 may send a request to a computing capacity pool management service 180 for computing capacity pool information. In one embodiment, a computing capacity pool may be a grouping of computing resources determined to be capable of hosting virtual machine instances meeting a predetermined baseline computing configuration. By maintaining such groupings or pools, computing capacity pool management service 180 can efficiently identify and allocate computing resources for hosting new customer virtual machine requests. Server 130 may also send the request on behalf of itself, or on behalf of other servers.

In response to the request for computing capacity pool information, computing capacity pool management service 180 may send a list of available computing capacity pools and associated computing capacity pool baseline configurations to server 130. The list of available computing capacity pools may be prioritized based on factors such as cost and policy information. Computing capacity pool management service 180 may also send information describing verification schedules. Computing capacity pool management service 180 may receive a request from server computer 130 to join one or more of the computing capacity pools. In response, computing capacity pool management service 180 may determine which, if any, of the plurality of available computing capacity pools that server computer 130 is eligible to join and the requirements for joining the pools. Server 130 may then perform one or more verification tasks to determine which of the pool requirements that it can meet and thus which computing capacity pools that server computer 130 may attempt to join.

Server computer 130 may then send the results of the verification tasks to computing capacity pool management service 180. Computing capacity pool management service 180 may then approve or disapprove admission to the requested computing capacity pools. As an example, a server computer may be configured to support virtual instances with a 32-bit platform and 4 GB memory. The server computer will not be able to host virtual instances that require greater than 4 GB memory unless the server computer has been updated. Once the server computer has been updated and the update has been verified, a computing capacity pool management service can determine that the server computer can now handle 32 bit instances with greater than 4 GB memory. The computing capacity pool management service can then include the server computer in a capacity pool of server computers that can support such instances.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 2:
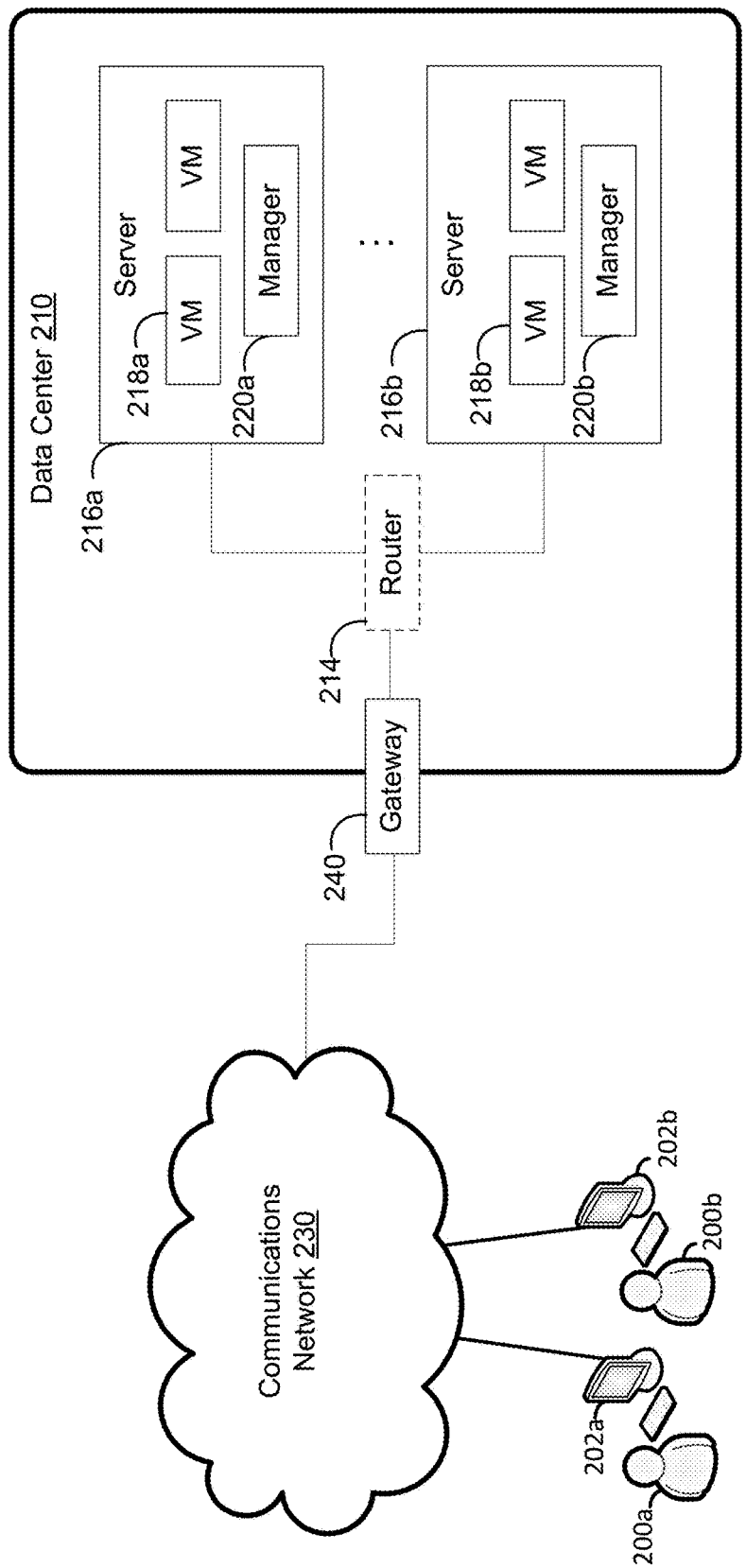
FIG. 2 illustrates an example computer system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

Data center 210 may include servers 216 that provide computing resources available as virtual machine instances 218. The virtual machine instances 218 may be configured to execute applications, including Web servers, application servers, media servers, database servers, and the like. Other resources that may be provided include data storage resources (not shown), and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMWare or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b capable of executing the virtual machine instances. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216*a* and 216*b*. Router 214 may also be connected to gateway 240 which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 3:
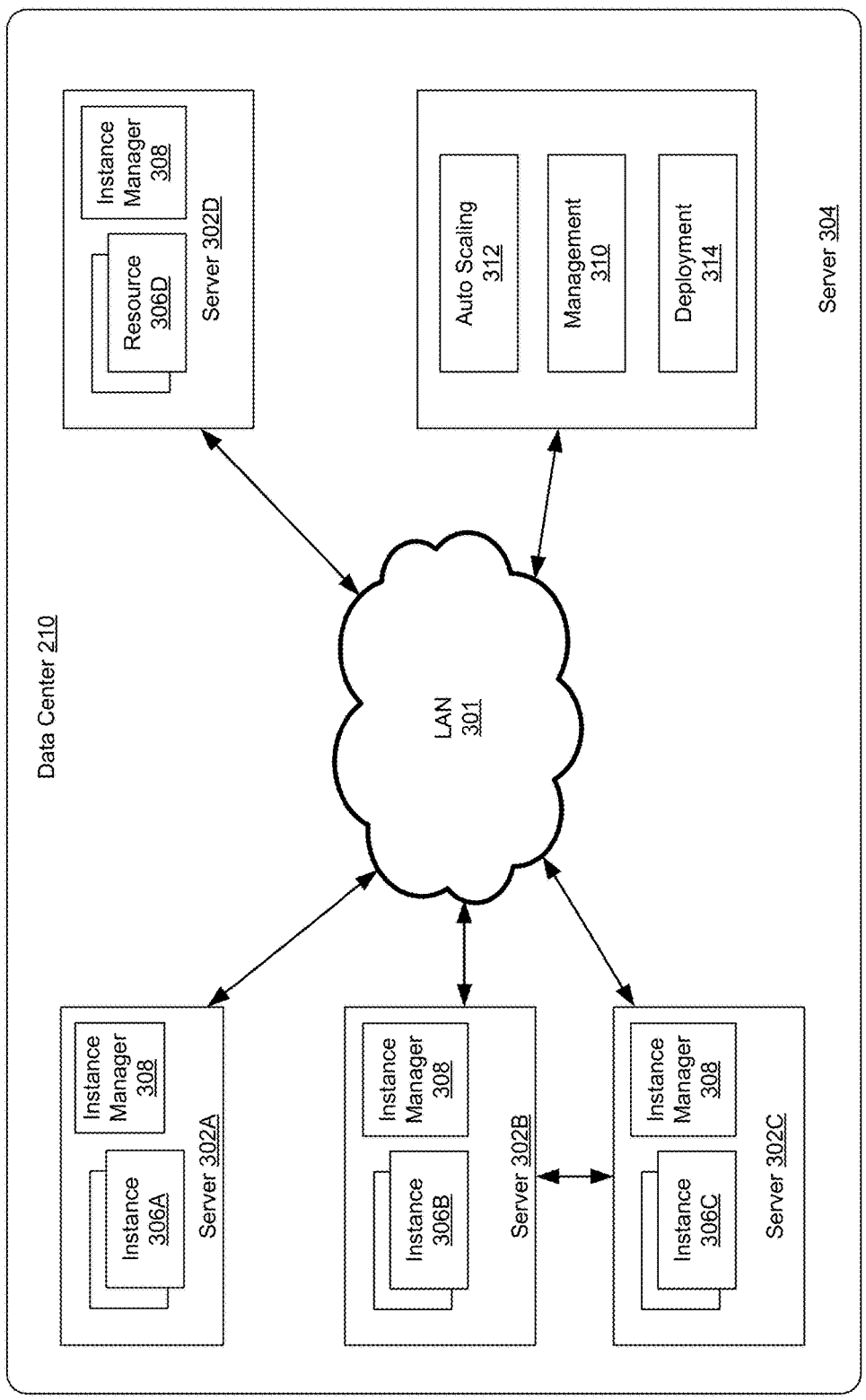
FIG. 3 illustrates an example computer system that may be used in some embodiments.

FIG. 3 is a computing system diagram that illustrates one configuration for a data center 310 configured to launch virtual machine instances. The example data center 210 shown in FIG. 3 includes several server computers 302A-302D (which may be referred herein singularly as "a server computer 302" or in the plural as "the server computers 302") for providing computing resources for executing an application. The server computers 302 may be standard tower or rack-mount server computers configured appropriately for providing the computing resources described above. For instance, in one implementation the server computers 302 are configured to provide instances 306A-306D of computing resources.

In one embodiment, the instances 306A-306D (which may be referred herein singularly as "an instance 306" or in the plural as "the instances 306") are virtual machine instances. As known in the art, a virtual machine instance is an instance of a software implementation of a machine (i.e., a computer) that executes programs like a physical machine. In the example of virtual machine instances, each of the servers 302 may be configured to execute an instance manager 308 capable of executing the instances. The instance manager 308 might be a hypervisor or another type of program configured to enable the execution of multiple instances 306 on a single server 302, for example. As discussed above, each of the instances 306 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 210 shown in FIG. 3 also includes a server computer 304 reserved for executing software components for managing the operation of the data center 210, the server computers 302, and the instances 306. In particular, the server computer 304 might execute a management component 310. As discussed above, a customer of data center 210 might utilize a customer computing system to access the management component 310 to configure various aspects of the operation of data center 210 and the instances 306 purchased by the customer. For example, the customer may purchase instances and make changes to the configuration of the instances. The customer might also specify settings regarding how the purchased instances are to be scaled in response to demand. The customer might also provide requests to launch instances to the management component 310.

As also described briefly above, an auto scaling component 312 scales the instances 306 based upon rules defined by a customer of data center 210. In one embodiment, for instance, the auto scaling component 312 allows a customer to specify scale up rules for use in determining when new instances should be instantiated and scale down rules for use in determining when existing instances should be terminated.

The auto scaling component 312 may execute on a single server computer 304 or in parallel across multiple server computers 302 in data center 210. In addition, the auto scaling component 312 may consist of a number of sub-components executing on different server computers 302 or other computing devices in data center 210. The auto scaling component 312 may be implemented as software, hardware, or any combination of the two. The auto scaling component 312 may monitor available computing resources in data center 210 over an internal management network, for example.

As discussed briefly above, data center 210 may also be configured with a deployment component 314 to assist customers in the deployment of new instances 306 of computing resources. The deployment component 314 may receive a configuration from a customer that includes data describing how new instances 306 should be configured. For example, the configuration might specify one or more applications that should be installed in new instances 306, provide scripts and/or other types of code to be executed for configuring new instances 306, provide cache warming logic specifying how an application cache should be prepared, and other types of information.

The deployment component 314 utilizes the customer-provided configuration and cache warming logic to configure, prime, and launch new instances 306. The configuration, cache warming logic, and other information may be specified by a customer using the management component 310 or by providing this information directly to deployment component 314. Other mechanisms might also be utilized to configure the operation of deployment component 314.

In the example data center 210 shown in FIG. 3, an appropriate LAN 301 is utilized to interconnect the server computers 302A-302D and the server computer 304. The LAN 301 is also connected to communications network 230 illustrated in FIG. 2. It should be appreciated that the network topology illustrated in FIGS. 2 and 3 has been greatly simplified and that many more networks and networking devices may be utilized to interconnect the various computing systems disclosed herein. Appropriate load balancing devices or software modules might also be utilized for balancing a load between data center 210 and other data centers (not shown), between each of the server computers 302A-302D in data center 210, and between instances 306 purchased by each customer of data center 210. These network topologies and devices should be apparent to those skilled in the art.

It should be appreciated that data center 210 described in FIG. 3 is merely illustrative and that other implementations might be utilized. In particular, functionality described herein as being performed by the management component 310, the auto scaling component 312, and the deployment component 314 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

One difficulty in providing virtualized computing resources such as virtual machine instances is determining how to maintain groupings of computing resources or computing capacity pools that meet specific requirements. In some embodiments, virtual machine instances may be "bin packed" onto one or more host computing devices (i.e., virtual machine instances of varying sizes may be allocated into a fixed number of host computing devices of varying capacities in a way that efficiently utilizes the available host computing devices). Alternatively, the host computing devices may be "sliced" or pre-allocated into multiples of various virtual instance-size quanta, and virtual machine instances may be assigned to the quanta based on the requested virtual instance.

Server computers in data centers that host virtual machine instances can have different grades of hardware and software, and some virtual instance types may have specific feature requirements that are not yet supported by all server computers in a data center. For example, some server computers might not be able to execute a desired virtual machine image because the server computer may lack necessary software updates within the most privileged domain executing on the server computer (also referred to as "dom0"). For example, older server computers in the data center may have security vulnerabilities that were only fixed after a certain point in time. In other cases, software updates may be desirable to improve features and capabilities for both privileged and non-privileged domains.

As discussed above, a computing capacity pool may be a grouping comprising one or more computing resources determined to be capable of hosting virtual machine instances meeting a predetermined baseline computing configuration. Computing capacity pools may be used to manage the allocation of virtual machine instances on the server computers in a data center. The computing capacity pools may each be matched to a known hardware/software baseline. However, managing a large number of customers being served by multiple server computers in this manner requires accurate forecasting in order to provide sufficient capacity to match actual customer demand. Furthermore, computing capacity pools tend to be static and many data centers do not centrally track every attribute of every server computer, making it difficult for service providers to constantly update capacity pool baseline requirements.

Over the course of a server computer's life cycle, it may be desirable to upgrade functionality or add new functions to the server computer, further adding to the potential variability of server computers in a data center. It would be desirable to continuously update all server computers in a data center and reprovision them to the latest complement of software or hardware so that every server computer is able to support every virtual machine instance type. However, this is not always possible or desirable, for example when a server computer is partially occupied with virtual instances. Updating occupied server computers may disrupt service to the occupant virtual instances, resulting in a poor customer experience. For the above described reasons, managing computing capacity pools can be a labor intensive process that in many cases must be processed manually. To further exacerbate the challenges, some data centers may house hundreds or thousands of servers and provide computing services to thousands of customers. Servers may be continuously added, the servers differing from one another by varying degrees, while others may have configurations that are becoming outdated. As new systems are added and older systems are moved out of service, the management of capacity pools that can provide support varying levels of functionality can become problematic and unmanageable.

In various embodiments disclosed herein, methods and systems for managing one or more computing resources using computing capacity pools or groupings are provided. In particular, a service is described that may receive and manage requests from server computers to be associated with various computing capacity pools. As described above, a computing capacity pool or grouping may be a list of one or more server computers meeting a predetermined baseline computing configuration. A computing capacity pool may thus include server computers determined to be capable of hosting virtual machine instances that match certain product stock-keeping unit (SKU) requirements. For example, a data center may provide a number of different virtual instance types to meet various customer computing needs, where each instance type may provide a predictable amount of dedicated computing capacity such as a predetermined memory to CPU ratio.

Figure 4:
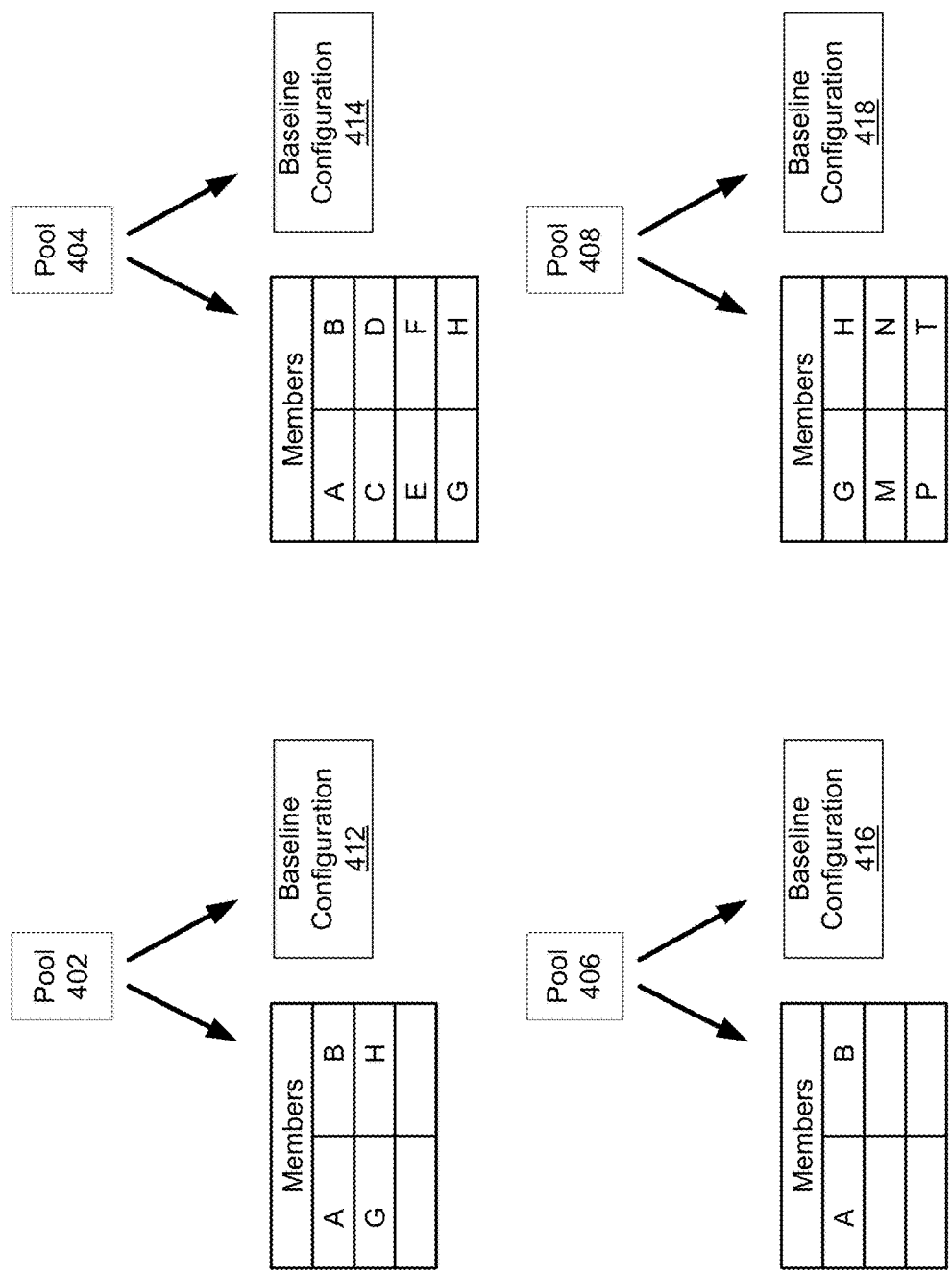
FIG. 4 is a diagram illustrating computing capacity pools.

FIG. 4 illustrates one embodiment in which computing resources are managed using computing capacity pools. FIG. 4 includes computing capacity pools 402, 404, 406, and 408 that each are identified with one or more server computers that meet or exceed the respective requirements for the capacity pools. In the figure, computing capacity pool 402 includes server computers A, B, G, and H. Computing capacity pool 404 includes server computers A, B, C, D, E, F, G, and H. Computing capacity pool 406 includes server computers A and B. Computing capacity pool 408 includes server computers G, H, M, N, P, and T. Each of the computing capacity pools 402, 404, 406, and 408 may be associated with respective minimum baseline configurations 412, 414, 416, and 418. As an example, baseline configuration 412 may require server computers with a specified processor chip and firmware. In one embodiment, membership in the computing capacity pools 402, 404, 406, and 408 may change as server computers join new computing capacity pools or leave existing computing capacity pools.

Figure 5:
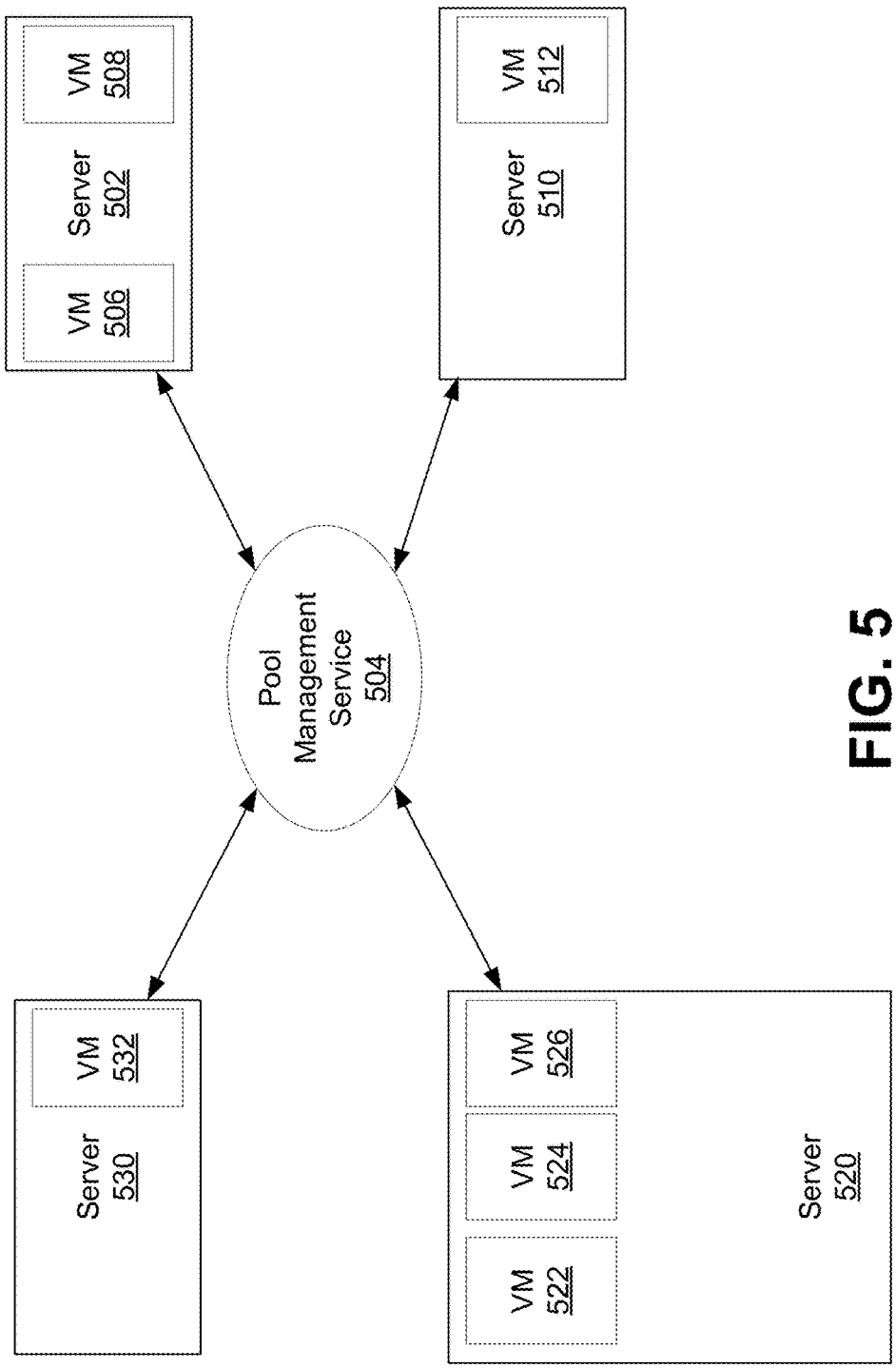
FIG. 5 is a diagram illustrating a mechanism for providing a computing capacity pool management service in accordance with the present disclosure.

FIG. 5 illustrates an example computing environment in which the embodiments described herein may be implemented. Referring to the figure, server computers 502, 510, 520, and 530 may communicate with a computing capacity pool management service 504 for access to computing capacity pool information. Server computer 502 may host virtual machine instances 506 and 508. Similarly, server computer 510 may host virtual machine instance 512, server computer 520 may host virtual machine instances 522, 524, and 526, and server computer 530 may host virtual machine instance 532.

Server computer 502 may send a request for computing capacity pool information to computing capacity pool management service 504. Computing capacity pool management service 504 may send information to server computer 502 indicating the various computing capacity pools and the requirements to be a member of each. For example, requirements may include software packages that need to be installed, or execution of a test to verify that a virtual instance of a particular type can function on an unoccupied slot on server computer 502. The information may also indicate when evaluation tasks can be performed. For example, the information may include an evaluation schedule that minimizes potential disruptions to existing services being provided to customers.

In one embodiment, the information describing the various computing capacity pools may be prioritized based on one or more criteria. For example, the capacity pools may be prioritized based on costs associated with joining the pools, or based on policies such as which computing capacity pools have the highest demand.

In some embodiments, the request for computing capacity pool information may be sent to computing capacity pool management service 504 from server computer 502 on behalf of one of the other server computers 510, 520, and 530. In other embodiments, a third party such as a service executing on one of the server computers 502, 510, 520, and 530, or executing on another computing device, may send the request on behalf of one or more of the server computers 502, 510, 520, and 530.

Server computer 502 may then conduct an evaluation and determine which, if any, of the requirements that it can meet or exceed. Server computer 502 can optionally perform verification tasks that it can perform without jeopardizing its ability to continue uninterrupted hosting of its occupant virtual instances since server computer 502 may already be a member of one or more computing capacity pools and may currently host one or more virtual machines. Server computer 502 may also obtain additional details for verification from computing capacity pool management service 504 or from some other source indicated by computing capacity pool management service 504.

Server computer 502 may optionally send a request to join one or more computing capacity pools to computing capacity pool management service 504. Server computer 502 may optionally include the cost of verifying server computer 502's ability to join to each proposed computing capacity pool. Computing capacity pool management service 504 may then evaluate the request and determine whether to allow server computer 502 to proceed. Computing capacity pool management service 504 can make this determination using a number of factors. For example, computing capacity pool management service 504 may assess global considerations such as the number of other server computers making requests and the number of available capacity pools that may be rendered unavailable while server computer 502 as well as other server computers perform verification tests.

Computing capacity pool management service 504 may determine if the proposed computing capacity pools can accept additional members, if any potential disruptions to existing services are acceptable, and make other determinations as necessary. Based on the determinations, computing capacity pool management service 504 may send an indication to proceed to server computer 502. Server computer 502, in response to receiving the indication to proceed, may then execute necessary verification tasks. The verification tasks may include, but is not limited to, running dom0 software tests, running virtual instances that simulate customer use cases, and gathering the results of the tests and use cases. Once the verification tasks have been completed, server computer 502 may send the results to computing capacity pool management service 504 for review of the results and determination as to which computing capacity pools that server computer 502 will be allowed to join.

Computing capacity pool management service 504 may analyze the information provided by server computer 502 including the test results. Based on the received information and additional factors as necessary, the computing capacity pool management service 504 may approve or disapprove admission to one or more of the requested computing capacity pools. Computing capacity pool management service 504 may, for example, consider admission approval/disapproval decisions based on the capacity pools that still have room for additional server computers, availability objectives for various computing resources, and server administration policies. After sending the approval/disapproval information by computing capacity pool management service 504, server computer 502 may be designated as being associated with each of the approved computing capacity pools. Computing capacity pool management service 504 may optionally disassociate server computer 502 from some computing capacity pools. For example, computing capacity pool management service 504 may have implemented policies to remove server computers from less valuable/rare pools or overpopulated pools.

By using a predetermined set of baseline configurations and established tests for verifying compliance with the configurations, computing capacity pools can be efficiently maintained and newly added functionality can be tracked by adding computing capacity pools as needed. Additionally, instead of taking server computers offline and temporarily out of a computing capacity pool to verify added functionality, verification tests can be structured so that server computers can run the tests while they are hosting virtual services and without disrupting the hosted services.

In some embodiments, the computing capacity pool management service can use policies and evaluation criteria to drive the computing capacity pool population to support certain computing resource management objectives. In one embodiment, computing capacity pools can be assigned different weights to influence pool membership requests submitted by server computers. For example, weights can be assigned so that computing capacity pools are populated in a more cost effective manner according to administrative policies or to evacuate server computers that have identified for eventual removal from service. For instance, older servers that are scheduled to be lease-returned can routinely be denied permission to join computing capacity pool memberships until the older servers eventually become unoccupied, at which point they can be lease-returned.

In some embodiments, computing capacity pools can be managed so that various availability objectives can be achieved. For example, weights can be assigned to computing capacity pools so that computing capacity pool availability can provide that at any point in time, an attempt to find a computing capacity pool that provides functionality set X has a Y % chance of succeeding. Data for determining the values of X and Y can be based on a predetermined policy. For example, one such policy may be that a predetermined amount of reserve instance capacity for a given set of attributes should be maintained. Other examples include ensuring that certain customer usage patterns can be supported. For example, one such usage pattern can be for each capacity pool containing instances owned by entity Z, the capacity pool is managed such that an additional Q % of instances can be accommodated. As another example, a computing capacity pool management service can determine that the available servers in a certain computing capacity pool are too low and should be increased. In other embodiments, historical data can be used to determine a computing capacity pool management policy.

The computing capacity pool management service may reside on a server computer or other computing resource in a data center. The computing capacity pool management service may in some embodiments be managed by a VMM or other management software executing in the data center. The computing capacity pool management service may also execute on one or more virtual machines.

Figure 6:
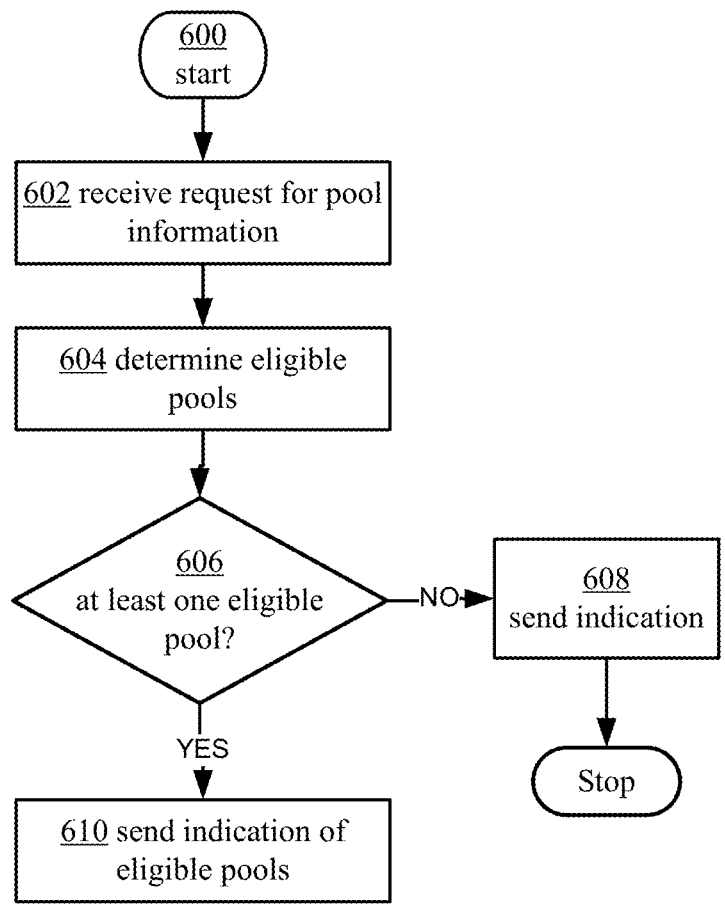
FIG. 6 is a flowchart depicting an example procedure for providing a computing capacity pool management service in accordance with the present disclosure.

FIG. 6 illustrates an example operational procedure for managing computing resources in a data center using computing capacity pools. In an embodiment, a computing capacity pool management service can correspond to computing capacity pool management service 504 in FIG. 5 or computing capacity pool management service 180 in FIG. 1.

Referring to FIG. 6, operation 600 begins the operational procedure. Operation 600 may be followed by operation 602. Operation 602 illustrates receiving a request from a computing device to determine which pools the computing device can be associated with. In an embodiment, a pool is a grouping of computing devices, such as server computers, maintained by a computing capacity pool management service and having common configurations capable of supporting one or more virtual instance types. In one embodiment, the common configurations can comprise a hardware and software configuration.

Operation 602 may be followed by operation 604. Operation 604 illustrates making a determination as to which of the pools the computing device can be associated with. In some embodiments, the determination may be based on at least one computer resources management criterion. For example, a computer resources management criterion may be a computing capacity pool management policy. In an embodiment, the determination may also be based in part on execution of tasks performed by the computing device to verify that the computing device meets or exceeds at least one of the common configurations.

Operation 604 may be followed by operation 606. If the requesting computing device is not eligible for any computing capacity pools, then operation 606 may be followed by operation 608. Operation 608 illustrates sending a message to the computing device indicating that the computing device is not eligible for any computing capacity pools. For example, if the computing device is an older server that has been identified for phase out, then the computing capacity pool management service may have implemented a policy that the computing device cannot join any computing capacity pools.

If the requesting computing device is eligible for at least one computing capacity pool, then operation 606 may be followed by operation 610. Operation 610 illustrates sending an indication to the computing device as to which of the pools the computing device can be associated with.

Figure 7:
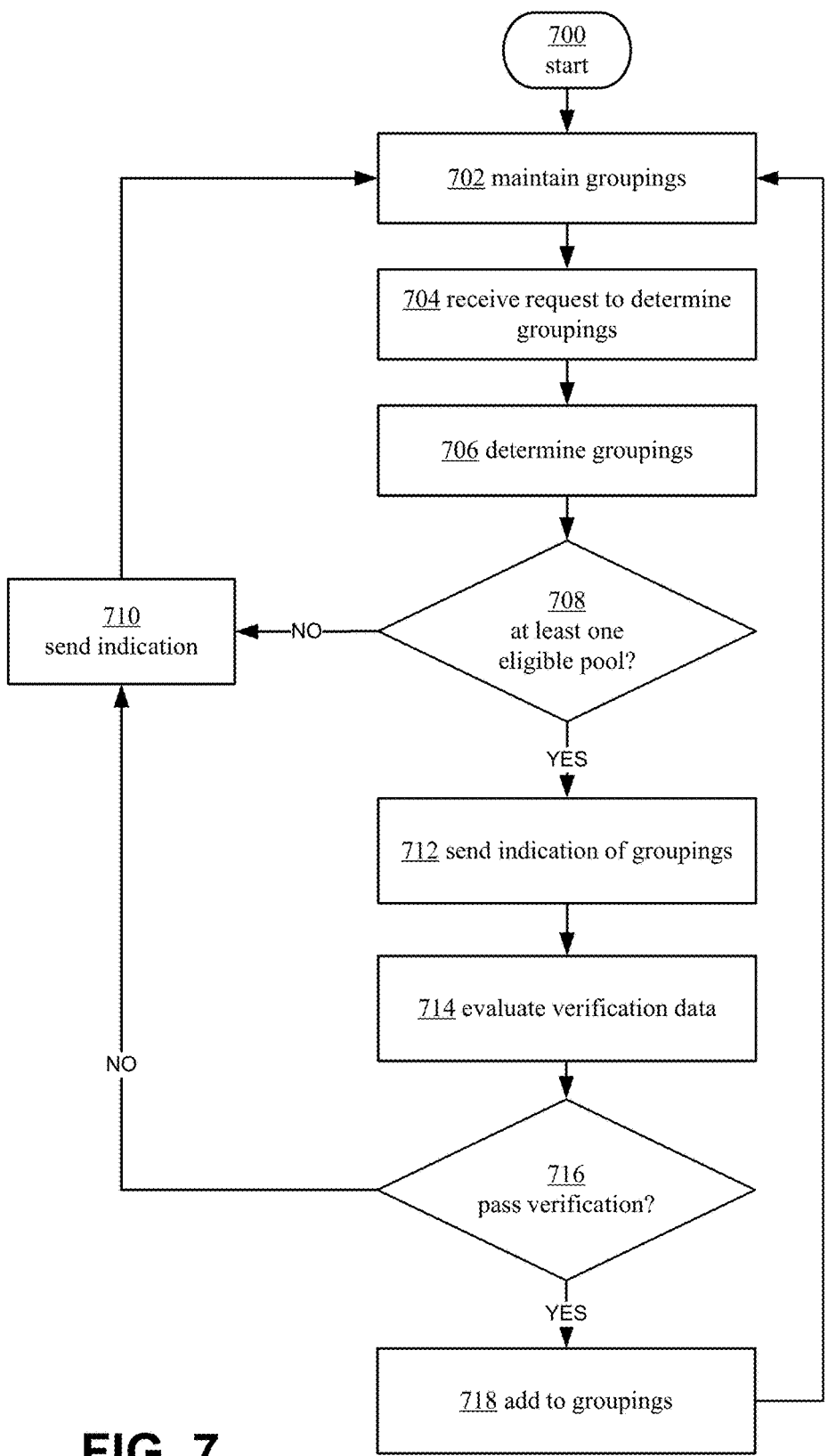
FIG. 7 is a flowchart depicting an example procedure for providing a computing capacity pool management service in accordance with the present disclosure.

FIG. 7 illustrates another example operational procedure for managing computing resources. Referring to FIG. 7, operation 700 begins the operational procedure. Operation 700 may be followed by operation 702. Operation 702 illustrates maintaining groupings of computer resources having common characteristics capable of supporting one or more computing tasks. In an embodiment, the common characteristics may comprise a computing baseline configuration. For example, the groupings may comprise one or more computing resources capable of hosting virtual machine instances meeting a predetermined baseline computing configuration, and the predetermined baseline computing configuration may comprise a hardware and software configuration Operation 702 may be followed by operation 704. Operation 704 illustrates receiving a request from a computing device to determine which of the groupings the computing device can be associated with. Operation 704 may be followed by operation 706. Operation 706 illustrates making a determination as to which of the groupings the computing device can be associated with. In an embodiment, the determination may be based on data verifying that the computing device satisfies the associated common characteristics. In one embodiment, the data may be based on tests executed by the computing device.

The determination may also be based on a computing capacity pool management policy, such as a target availability goal. For example, the determination may be based on a number of groupings that will be rendered unavailable when the computing device attempts to join one or more of the groupings In one embodiment, an indication may be sent to the computing device as to which, if any, of the groupings that the computing device is eligible to join. Furthermore, data received from the computing device may be evaluated to verify that the computing device meets the common characteristics associated with the groupings that the computing device is eligible to join.

Operation 706 may be followed by operation 708. If the requesting computing device is not eligible for at least one computing capacity pool, then operation 708 may be followed by operation 710. Operation 710 illustrates sending an indication to the computing device that the computing device is not eligible to join any of the groupings. Additionally and optionally, the computing device may be removed from one or more of the groupings.

If the requesting computing device is eligible for at least one computing capacity pool, then operation 708 may be followed by operation 712. Operation 712 illustrates sending an indication to the computing device as to which of the groupings the computing device can be associated with. Operation 712 may be followed by operation 714. Operation 714 illustrates evaluating verification data received from the computing device. In one embodiment, the verification data includes results from tests executed by the computing device to verify that the computing device complies with the common characteristics.

Operation 714 may be followed by operation 716. If the computing devices has been determined to comply with the common characteristics, then operation 716 may be followed by operation 718. Operation 718 illustrates associating the computing device with the groupings for which the computing device is eligible to join and complies with the common characteristics. If it has been determined that the computing device does not comply with the common characteristics, then operation 716 may be followed by operation 710.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A computing system comprising at least one computing node and at least one data store in communication with the at least one computing node, the at least one data store having stored therein computer-readable instructions, the computer-readable instructions retrievable and executable by the at least one computing node, the computer-readable instructions comprising instructions that upon execution by the at least one computing node, cause at least:
   maintaining pools of computer resources grouped by common computing configurations capable of supporting one or more virtual computing instance types;
   in response to receiving a request from one of a plurality of servers of a data center, sending, to the one server, information pertaining to the pools and the common computing configurations and a schedule indicating when verification tasks are performable to determine whether the one server meets or exceeds the common computing configurations;
   receiving, from the one server, verification information that the one server meets or exceeds at least one of the common computing configurations;
   in response to the verification information, making a determination that the one server can be associated with one of the pools associated with the at least one of the common computing configurations that is met or exceeded, wherein the making the determination is based at least in part on weighting the one pool to provide a selected probability that the one pool is available; and
   sending an indication to the one server that the one server can be associated with the one pool.

2. The computing system according to claim 1, wherein the common computing configurations comprise a hardware and software configuration.

3. The computing system according to claim 1, wherein the making the determination is based on at least one computer resources management criterion.

4. The computing system according to claim 3, wherein the least one computer resources management criterion is a computing capacity pool management policy.

5. A method for managing computing resources, the method comprising:
   maintaining groupings of computing resources having common baseline computing hardware and software configurations capable of supporting one or more computing tasks;
   in response to receiving, from an unassociated computing device of the managed computing resources, a request to determine which of the groupings the unassociated computing device of the managed computing resources can be associated with, sending data indicative of one or more of the groupings and their respective configurations and a schedule indicating when verification tasks are performable to determine whether the unassociated computing device meets or exceeds the respective configurations;
   receiving, from the unassociated computing device, verification information that the unassociated computing device meets or exceeds at least one of the common baseline computing hardware and software configurations;
   based at least in part on the verification information, making a determination as to which of the groupings the unassociated computing device can be associated with based at least in part on the common baseline computing hardware and software configurations, wherein the making the determination is further based at least in part on weighting a first grouping to provide a selected probability that the first grouping is available; and
   sending an indication as to which of the groupings the unassociated computing device can be associated with.

6. The method of claim 5, wherein the groupings comprise one or more computing resources capable of hosting virtual machine instances meeting the common baseline computing hardware and software configurations.

7. The method of claim 5, further comprising sending the indication to other computing resources.

8. The method of claim 5, wherein said making a determination is based on data verifying that the unassociated computing device satisfies the associated common baseline computing hardware and software configurations.

9. The method of claim 8, wherein the data is based on tests executed by the unassociated computing device.

10. The method of claim 5, wherein said making a determination is based on a computing capacity pool management policy.

11. The method of claim 10, wherein the computing capacity pool management policy is a target availability goal.

12. The method of claim 5, wherein said making a determination comprises:
   sending an indication to the unassociated computing device as to which, if any, of the groupings that the unassociated computing device is eligible to join; and
   evaluating data received from the unassociated computing device verifying that the unassociated computing device meets the common baseline computing hardware and software configurations associated with the groupings that the unassociated computing device is eligible to join.

13. The method of claim 5, wherein said making a determination is based on a number of groupings that will be rendered unavailable when the unassociated computing device attempts to join one or more of the groupings.

14. The method of claim 5, further comprising removing the computing device from one or more of the groupings.

15. A non-transitory computer-readable storage medium having stored thereon computer-readable instructions, the computer-readable instructions comprising instructions that upon execution on a computing device, at least cause:

receiving, from a computing capacity management service, data indicative of a plurality of computing capacity pools, the plurality of computing capacity pools having common baseline computing hardware and software configurations capable of supporting one or more computing tasks;

sending a request to the computing capacity management service to associate one of a plurality of computing devices with one or more of the plurality of computing capacity pools;

receiving, from the computing capacity management service, an indication to verify common baseline computing hardware and software configurations associated with the one or more computing capacity pools and a schedule indicating when verification tasks are performable to determine whether the one computing device meets or exceeds the common baseline computing hardware and software configurations;

causing execution of one or more of the verification tasks to verify that the one computing device meets or exceeds the common baseline computing hardware and software configurations of the one or more computing capacity pools;

sending results of the execution of the one or more verifications tasks to the computing capacity management service; and receiving an indication that the one computing device can be associated with the one or more computing capacity pools, the indication determined based at least in part on the results and on weighting the one or more computing capacity pools to provide a selected probability that the one or more computing capacity pools are available.

16. The non-transitory computer-readable storage medium of claim 15, further comprising computer-readable instructions that upon execution on a computing node, at least cause receiving confirmation of association of the one computing device with the one or more computing capacity pools.

17. The non-transitory computer-readable storage medium of claim 15, wherein the data indicative of the plurality of computing capacity pools is prioritized based on costs associated with joining the plurality of computing capacity pools.

18. The non-transitory computer-readable storage medium of claim 15, wherein the plurality of computing capacity pools comprise host servers configured to execute virtual machine instances.

* * * * *